United States Patent [19]

Gröhl

[11] 4,236,480
[45] Dec. 2, 1980

[54] INDICATOR DIAL AND METHOD OF MAKING SAME

[75] Inventor: Friedrich Gröhl, Nierstein, Fed. Rep. of Germany

[73] Assignee: VDO Adolf Schindling A.G., Frankfurt am Main, Fed. Rep. of Germany

[21] Appl. No.: 967,641

[22] Filed: Dec. 8, 1978

[30] Foreign Application Priority Data

Feb. 8, 1978 [DE] Fed. Rep. of Germany ....... 2805159

[51] Int. Cl.³ .................... G09F 9/307; G01D 11/28
[52] U.S. Cl. .................................... 116/286; 40/573; 116/298; 362/29
[58] Field of Search ............... 116/286, 287, DIG. 26, 116/DIG. 36, 298; 362/29, 23, 28; 40/577, 615, 573

[56] References Cited

U.S. PATENT DOCUMENTS

| | | | |
|---|---|---|---|
| 2,108,342 | 2/1938 | LeFevre | 362/29 X |
| 2,372,124 | 3/1945 | Schenkel | 40/577 |
| 2,563,537 | 8/1951 | Lash | 116/286 |
| 2,594,081 | 4/1952 | Shlenker | 362/29 X |
| 2,824,954 | 2/1958 | Roper | 116/286 X |
| 2,886,911 | 5/1959 | Hardesty | 116/DIG. 36 |
| 2,931,117 | 4/1960 | Bosworth et al. | 362/29 X |
| 3,499,417 | 3/1970 | Heinke | 362/29 |
| 3,503,365 | 3/1970 | Baez et al. | 116/287 |
| 3,780,463 | 12/1973 | Arnoff | 40/577 X |

Primary Examiner—Daniel M. Yasich
Attorney, Agent, or Firm—Otto J. Munz

[57] ABSTRACT

An indicator dial having at least one scale thereon and having at least one illuminable indication area for providing a visual signal of a physical function, wherein the dial comprises a thin transparent plate having an opaque dye coat on one face thereof with at least one area free of the opaque dye coat and having a translucent dye coat of contrasting color in the area, and the scale being on the side of the plate facing a viewer, whereby the scale is visible at all times, but the indication areas are visible to the viewer only when illuminated from behind the dial. The dial is made by applying the dye coats and scale markings in sequential operations by use of a screen printing process.

6 Claims, 5 Drawing Figures

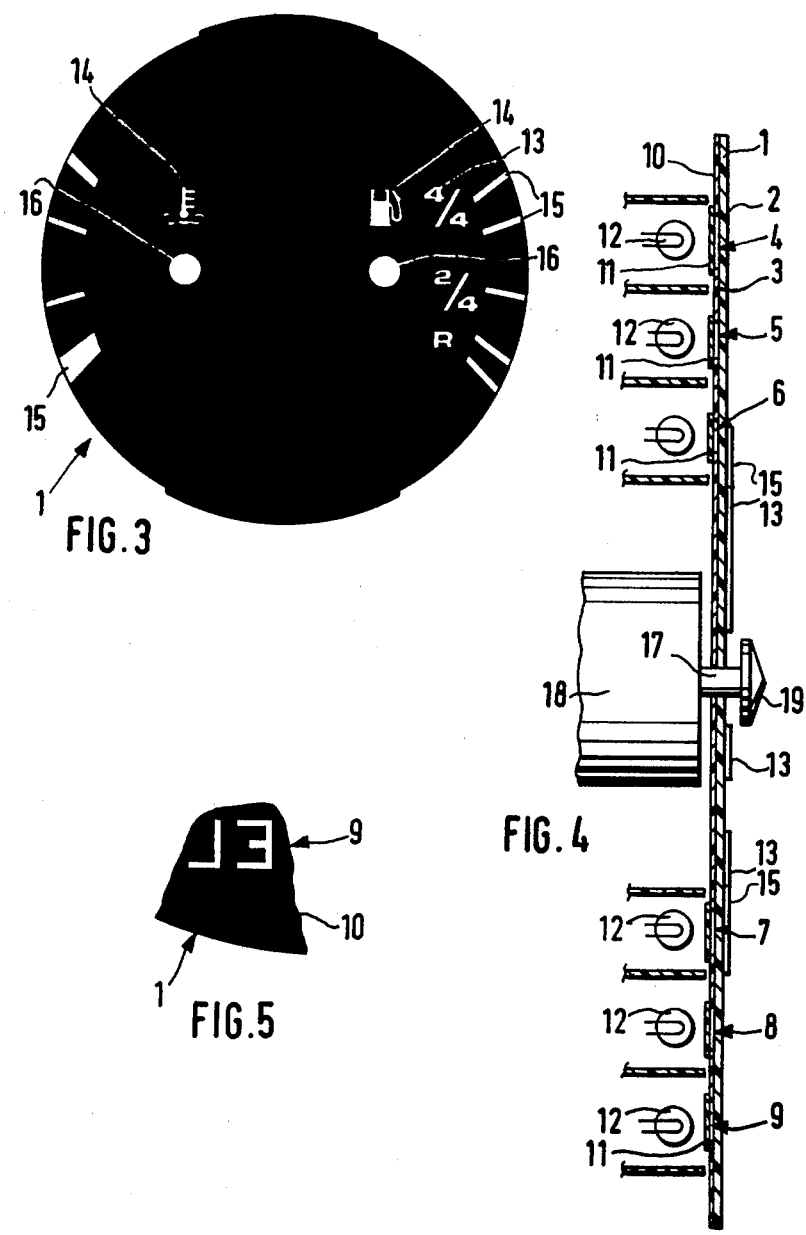

INDICATOR DIAL AND METHOD OF MAKING SAME

BACKGROUND OF THE INVENTION

The invention relates to an indicator dial comprising at least one scale which consists of marking symbols, and further comprising at least one indication area a translucent, illuminable indicator warning field, which is illuminable in the case of warning.

Known dials of this type consist usually of a thin sheet metal plate having a black coating on the side that faces the viewer, and a scale printed thereon with white and red symbols, and further provided, at one or more scale-free spots, with an indication area. Each indication area consists of a usually rectangular or arched recess or opening in the sheet metal plate, behind which recess a colored plastic material window is provided. Behind the plastic material window an incandescent lamp is arranged which, when it is switched on, illuminates the plastic material window and thus communicates to the viewer an optical signal indicating a proper or improper functioning of a physical force. For better distinction of the signals, the plastic material windows are usually provided with symbols or a lettering which are either permanently visible or become visible only when the light is switched on. In the last-mentioned case, the symbols or letters are located on the side of the plastic window that faces away from the viewer. The illumination of the entire dial surface, e.g. at darkness, takes place by the incident light process, i.e., the light of an incandescent lamp strikes the face of the dial directly or indirectly.

Furthermore, dials are also known that consist of a plate which is thick in comparison to the aforementioned dials, and which is made of transparent material. The plate is provided on both sides with a light-reflecting layer or coat, and the coat facing the viewer is made so thin that light can pass through it and emerge. This thin layer is covered with an opaque layer which is provided with interruptions that form marking symbols and scale marks. The layer on the side facing away from the viewer has an aperture through which light can be radiated into the interior of the plate so as to illuminate the dial. In these dials, illuminated according to the floodlight principle, provision of a recess for a separately illuminable indication area is not possible since the uniformity of the illumination of the dial would be disturbed by such recess, and undesirable illumination losses would also occur.

SUMMARY OF THE INVENTION

The present invention has for an object the provision of a dial of the aforementioned type that, while eliminating the disadvantages of the known dials, can be manufactured in large quantities at the smallest possible cost.

This object is achieved according to the invention by a device wherein the dial comprises a thin plate of transparent material covered on one side or face with a coat of a first opaque dye material, and having areas free of the first dye material, with a translucent coat of a second dye material of contrasting color in the areas and defining indication areas or fields. The side of the plate facing the viewer has scale symbols applied in a color that contrasts to the first dye coat.

The dial of the invention can therefore be manufactured merely by the application of different dye coats, and the problems found with prior art dials, i.e. the pasting or cementing of plastic material windows on the dial with all its disadvantages, e.g. pasting on of false windows on the recesses, confusion in placing windows and recesses in the case of two or more recesses, windows displaced with relation to the recess edges, unintentional detachment of the windows when too little or overflowing adhesive is used between recess and window or when too much adhesive is used, etc., are eliminated, and waste is reduced and the storage is substantially simplified. Due to the smooth surface of the dial of the invention, which has no cuts or recesses whatsoever, an advantageous aesthetic total impression also resuots, and, as will be shown below, can be further improved by suitable choice of color for the individual coats.

It has proven particularly advantageous to use a black first dye coat, white scale symbols, and a second dye coat with a symbol color of dark tint. In this manner the result is achieved that the individual indication area or areas are normally completely invisible, including times when the dial is illuminated by incident light, and it is only in the case of warning, i.e., when the incandescent lamp provided behind the indication area is supplied electric current, that the indication area is illuminated and visible. A further increase of this effect can be achieved by a structure wherein the transparent plate is marked on the side facing the viewer and the first dye coat is applied to the plate side facing away from the viewer.

In a further advantageous embodiment of the invention, a red second dye coat is provided. Another advantageous possibility consists in the provision of a green second dye coat. The red dye coat will generally be preferred when the indication area has to taken over a warning function, whereas when the indication area has merely an indicating function, the use of a green dye coat is preferred. A warning function is taken over by the indication area in a motor vehicle, e.g., when it deals with data that relate to traffic safety or the operation of the motor vehicle, e.g., the engine oil pressure, the braking fluid minimum level, the outside lighting etc., whereas the indication area takes over an indicating function when it deals with data such as windshield washing water minimum level, the position lamps, the direction indicators, etc.

The marking of the individual indication areas with symbols, numbers, and/or letters may take place by the application of a suitable lettering to the plate side facing the viewer with a suitably contrasting dye. It is, however, more advantageous to provide as the indication area a lettering defined by the first dye coat itself, which may consist of a symbol, or a sequence of numbers and/or letters, as the indicating area. In the case of warning or indication, a symbol or a character appears on the dial. When the incandescent lamps associated with the indication areas are switched off, the indication areas as well as any symbols, letters or members associated therewith are invisible, whereby a pleasing aesthetic effect is achieved on a free surface of the dial.

According to a preferred embodiment of the invention, the individual dyes or dye coats are successively applied in accordance with a conventional screen printing process. Thus, not only can particularly sharp transitions of the marking symbols be obtained, but also, particularly sharply defined indication areas, and especially those which consist merely of lettering, can be obtained inexpensively and without problems.

BRIEF DESCRIPTION OF THE DRAWINGS

FIG. 3 is a plan view of a further dial;

FIG. 4 is a section through the dial of FIG. 1 along line IV—IV in FIG. 2;

FIG. 5 is a fragmentary detail view of the back of the dial of FIG. 1, taken at the area indicated by broken line in FIG. 2.

DETAILED DESCRIPTION OF THE PREFERRED EMBODIMENT

Figure 1:
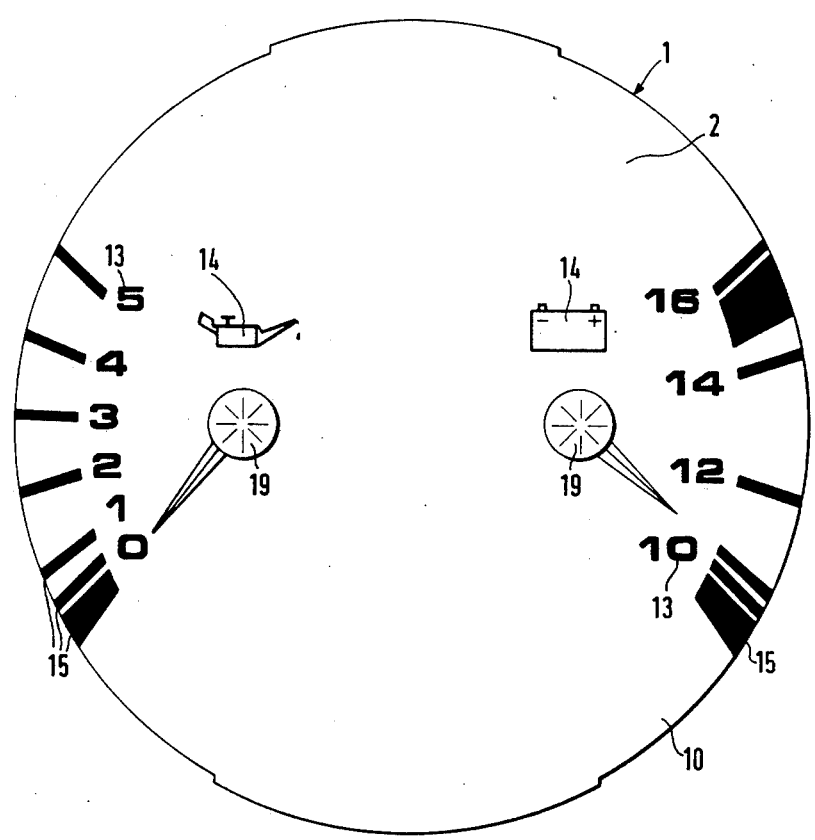
FIG. 1 is a plan view of a first dial according to the invention, with the indication areas non-illuminated.
Figure 2:
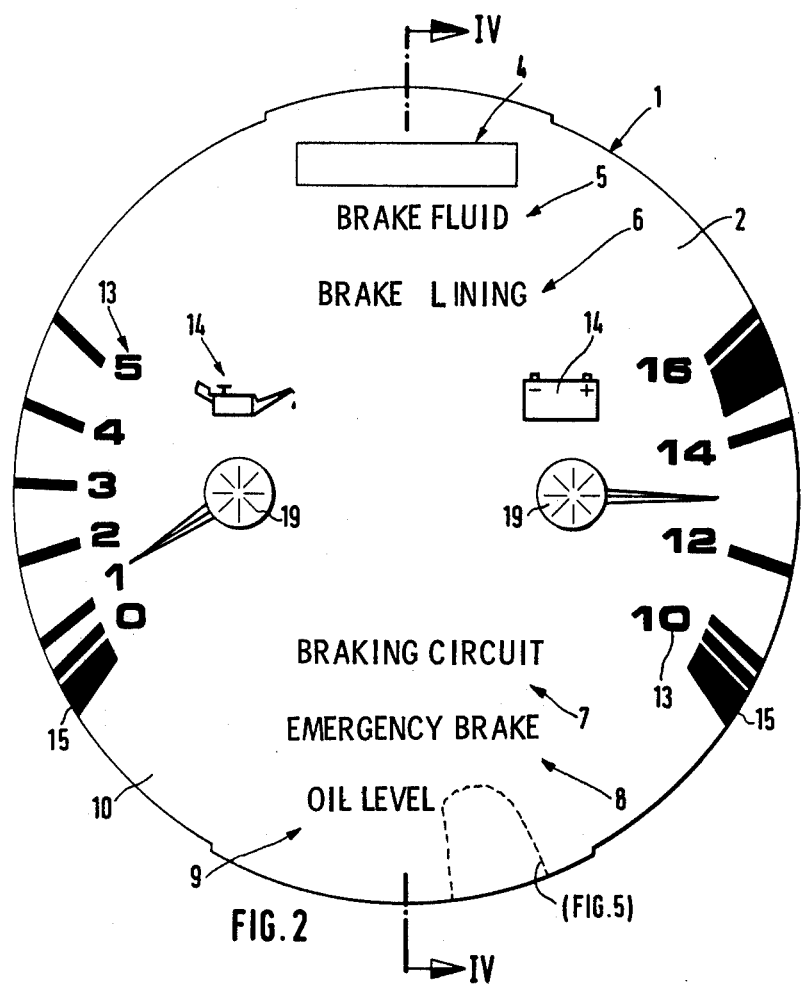
FIG. 2 is a plan view of the dial of FIG. 1, shown upon the occurrence of warning, with the indication areas illuminated.

As shown in FIGS. 1, 2 and 4, the dial of the invention comprises a thin plate or disc 1 of a transparent plastic material which on the surface 2 that faces the viewer is matted. On its other side 3 it is provided with a first opaque black dye coat 10 (shown in FIGS. 1 and 2 as white), having areas 4,5,6,7,8, and 9 free of the dye coat and defining indication areas.

Indication area 4 is formed by a rectangular area free of the dye coat 10, while the other indication areas each comprise a series of letters, with each letter being formed by a corresponding area free of dye coat 10. The individual letters shown in FIG. 2 are thus dye-free spots in the black dye coat 10, as shown in FIG. 5. The latter shows a cutout of the backside of the dial after the application of the black dye coat 10.

The individual indication areas 4,5,6,7,8 and 9 are, as shown particularly in FIG. 4, each coated, on the side 3 of disc 1 which faces away from the viewer, with a further dye coat 11 which slightly contrasts with the color of dye coat 10. Dye coat 11 may consist of dark red or dark green dye. On the basis of the slight contrast of the two dyes applied, the indication areas are invisible when the incandescent lamps 12 arranged behind these areas are not switched on. In this case, the dial appears to the viewer as shown in FIG. 1. This is, by the way, also the case when it is illuminated from the front by incident light, e.g. at darkness.

As soon, however, as one of the incandescent lamps 12 is switched on, there appears on the dial surface in red or green letters the information associated with the incandescent lamp, e.g. "brake lining". When all lamps are switched on, the dial appears to the viewer as shown in FIG. 2, the dial surface being black, the indication areas in red or green light, and the black numbers 13, symbols 14, and scale marks 15, white.

Numbers 13, symbols 14, and scale marks 15 are printed upon the marked front side of disc 1. Holes 16 are provided for the passage of the pointer shafts 17 of the measuring mechanisms 18. Pointers 19 are mounted on these pointer shafts.

An orthochromatic dial is shown in FIG. 3, the incandescent areas not being illuminated. This dial is otherwise constructed the same as the dial first described.

The printing-on of the individual dye coats 10 and 11 as well as of numbers 13, symbols 14 and scale marks 15 takes place rapidly in a simple and accurate manner by the use of a conventional screen printing process.

What is claimed is:

1. An indicator dial, comprising:

a transparent plate having a front side toward a viewer and a rear side facing away from a viewer with a coating of a first, opaque dye material covering the rear side and having at least one selected area free of the dye material;

a second, translucent dye coat of a color contrasting with the first dye coat covering the selected area on the rear side, and defining at least one illuminable indication area for providing a visual indication of a physical function when the indication area is illuminated from the side of the plate facing away from the viewer;

scale symbols of a color contrasting with the first dye coat applied on the front side of the plate in the at least one illuminable indication area; partitioned lamp means at the rear side of the plate, positioned to direct light to the at least one illuminable indication area for illumination of the area; and an aperture in the dial for an indicator shaft.

2. An indicator dial as claimed in claim 1, wherein: the first dye coat is black; the second dye coat has a dark tint; and the scale symbols are white.

3. An indicator dial as claimed in claim 2, wherein: the second dye coat is red.

4. An indicator dial as claimed in claim 2, wherein: the second dye coat is green.

5. An indicator dial as claimed in claim 2, wherein: the areas free of the first dye coat are shaped as lettering defining the indication means.

6. An indicator dial as claimed in claim 1, wherein: said front side of the plate is matted.

* * * * *